(12) United States Patent
Hosoya et al.

(10) Patent No.: US 10,337,422 B2
(45) Date of Patent: Jul. 2, 2019

(54) CONTROL APPARATUS FOR INTERNAL COMBUSTION ENGINE, AND ABNORMALITY DIAGNOSIS SYSTEM FOR CONTROL APPARATUS FOR INTERNAL COMBUSTION ENGINE

(71) Applicant: Toyota Jidosha Kabushiki Kaisha, Toyota-shi, Aichi-ken (JP)

(72) Inventors: Takanobu Hosoya, Gotemba (JP); Yasuyuki Irisawa, Susono (JP); Hirofumi Kubota, Mishima (JP); Takashi Tsunooka, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 51 days.

(21) Appl. No.: 15/845,447

(22) Filed: Dec. 18, 2017

(65) Prior Publication Data

US 2018/0179966 A1 Jun. 28, 2018

(30) Foreign Application Priority Data

Dec. 27, 2016 (JP) .................................. 2016-252905

(51) Int. Cl.
*F02B 37/18* (2006.01)
*F02D 41/00* (2006.01)
(Continued)

(52) U.S. Cl.
CPC ........ *F02D 41/0007* (2013.01); *F02B 37/183* (2013.01); *F02D 41/1439* (2013.01);
(Continued)

(58) Field of Classification Search
CPC .......... F02D 43/00; F02D 43/02; F02D 43/04; F02D 2250/34; F02D 41/0007;
(Continued)

(56) References Cited

U.S. PATENT DOCUMENTS 4,930,315 A * 6/1990 Kanesaka ............... F02B 29/00
60/600
7,426,831 B2 * 9/2008 Grissom ............... F02B 37/013
123/562
(Continued)

FOREIGN PATENT DOCUMENTS

JP 2001-050038 A 2/2001

OTHER PUBLICATIONS

U.S. Appl. No. 15/808,172, filed Nov. 9, 2017 Inventors: Hosoya et al.

*Primary Examiner* — Mark A Laurenzi
*Assistant Examiner* — Mickey H France
(74) *Attorney, Agent, or Firm* — Dinsmore & Shohl LLP

(57) ABSTRACT

A control apparatus for an internal combustion engine includes a turbocharger, a bypass passage, a waste gate valve, a turbo bypass valve, an air-fuel ratio sensor and an electronic control unit. The air-fuel ratio sensor is provided in an exhaust passage downstream of a merging point at which the bypass passage merges with the exhaust passage. The electronic control unit is configured to, when a predetermined acceleration request is established and a required opening degree of the turbo bypass valve is larger than a predetermined reference opening degree, execute air-fuel ratio control for changing an air-fuel ratio of exhaust gas from the internal combustion engine for a predetermined first period, and close the waste gate valve based on a convergence status of detected air-fuel ratio fluctuations. The detected air-fuel ratio fluctuations are fluctuations in air-fuel ratio that is detected by the air-fuel ratio sensor resulting from the air-fuel ratio control.

6 Claims, 11 Drawing Sheets

(51) Int. Cl.
  *F02D 41/14*  (2006.01)
  *F02D 41/22*  (2006.01)
(52) U.S. Cl.
  CPC ..... *F02D 41/1454* (2013.01); *F02D 41/1495* (2013.01); *F02D 41/221* (2013.01); *Y02T 10/144* (2013.01); *Y02T 10/40* (2013.01)
(58) Field of Classification Search
  CPC ............. F02D 41/1495; F02D 41/1454; F02D 37/183; F02D 41/1439; F02D 41/0085; F02B 37/18; F02B 37/183; F02B 37/186; F01N 2900/0416; F01N 2430/06
  USPC ....... 123/383, 528, 559.1, 565; 60/597, 598, 60/600–603, 605.1, 612, 614, 615
  See application file for complete search history.

(56) References Cited

U.S. PATENT DOCUMENTS

| | | | | |
|---|---|---|---|---|
| 8,033,108 B2* | 10/2011 | Ishikawa | ............... | F02B 37/013 123/562 |
| 8,511,066 B2* | 8/2013 | Harris | ................. | F02B 37/013 60/280 |
| 8,720,200 B2* | 5/2014 | Tsukamoto | ........... | F02B 37/004 60/602 |
| 9,835,082 B2* | 12/2017 | VanDerWege | ...... | F02D 41/0087 |
| 10,107,182 B2* | 10/2018 | VanDerWege | ...... | F02D 41/0087 |
| 2006/0137343 A1* | 6/2006 | Grissom | ............... | F02B 37/013 60/602 |
| 2007/0079612 A1* | 4/2007 | Grissom | ............... | F02B 37/013 60/602 |
| 2009/0007564 A1* | 1/2009 | Suzuki | .................... | F02B 37/18 60/602 |
| 2010/0180590 A1* | 7/2010 | Andreae | ............... | F02B 37/013 60/600 |
| 2011/0126812 A1* | 6/2011 | Miyashita | ............. | F01N 13/107 123/703 |
| 2013/0327037 A1* | 12/2013 | Fukui | .................. | F02D 41/0007 60/600 |
| 2015/0047342 A1* | 2/2015 | McConville | ............ | F02B 47/08 60/600 |
| 2015/0204257 A1* | 7/2015 | Osumi | ................ | F02D 41/0062 123/564 |
| 2016/0108798 A1* | 4/2016 | VanDerWege | ...... | F02D 41/0087 60/602 |
| 2017/0276067 A1* | 9/2017 | Hand, III | ........... | F02D 41/1448 |
| 2018/0003102 A1* | 1/2018 | VanDerWege | ...... | F02D 41/0087 |

* cited by examiner

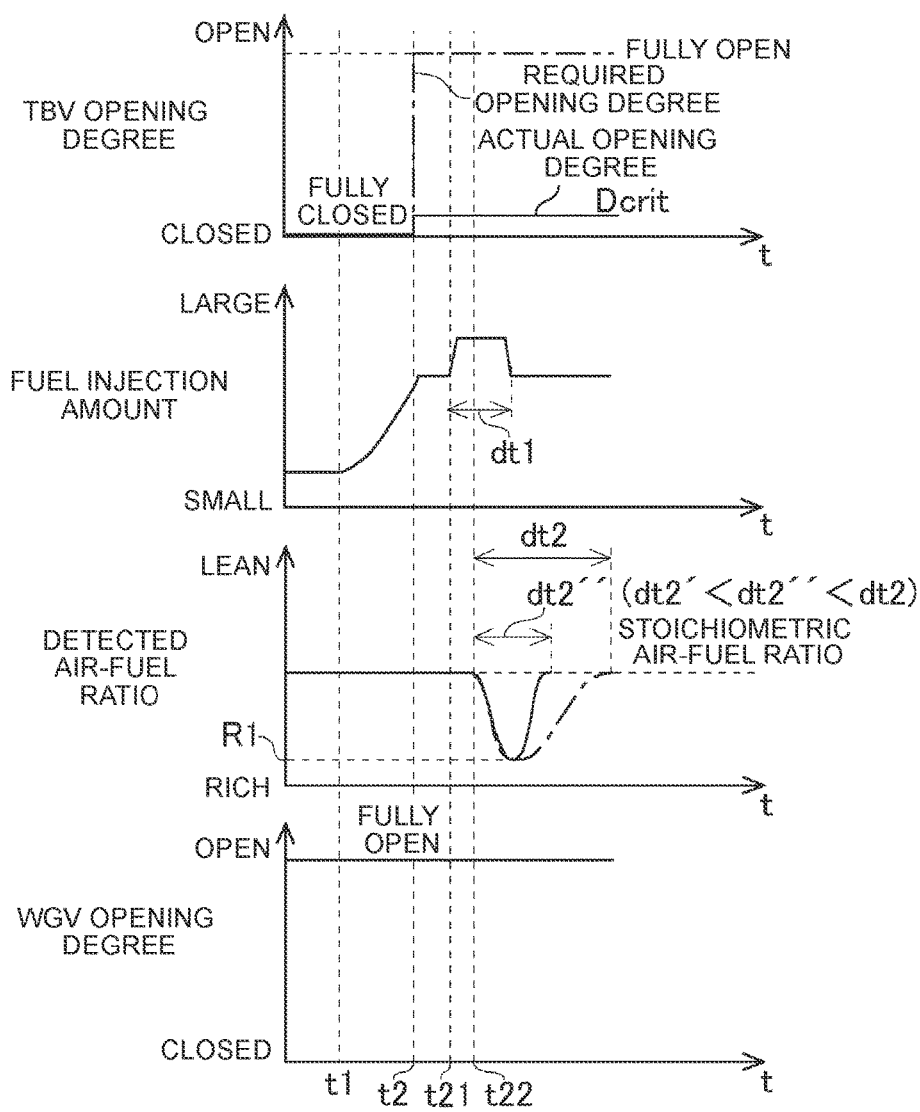

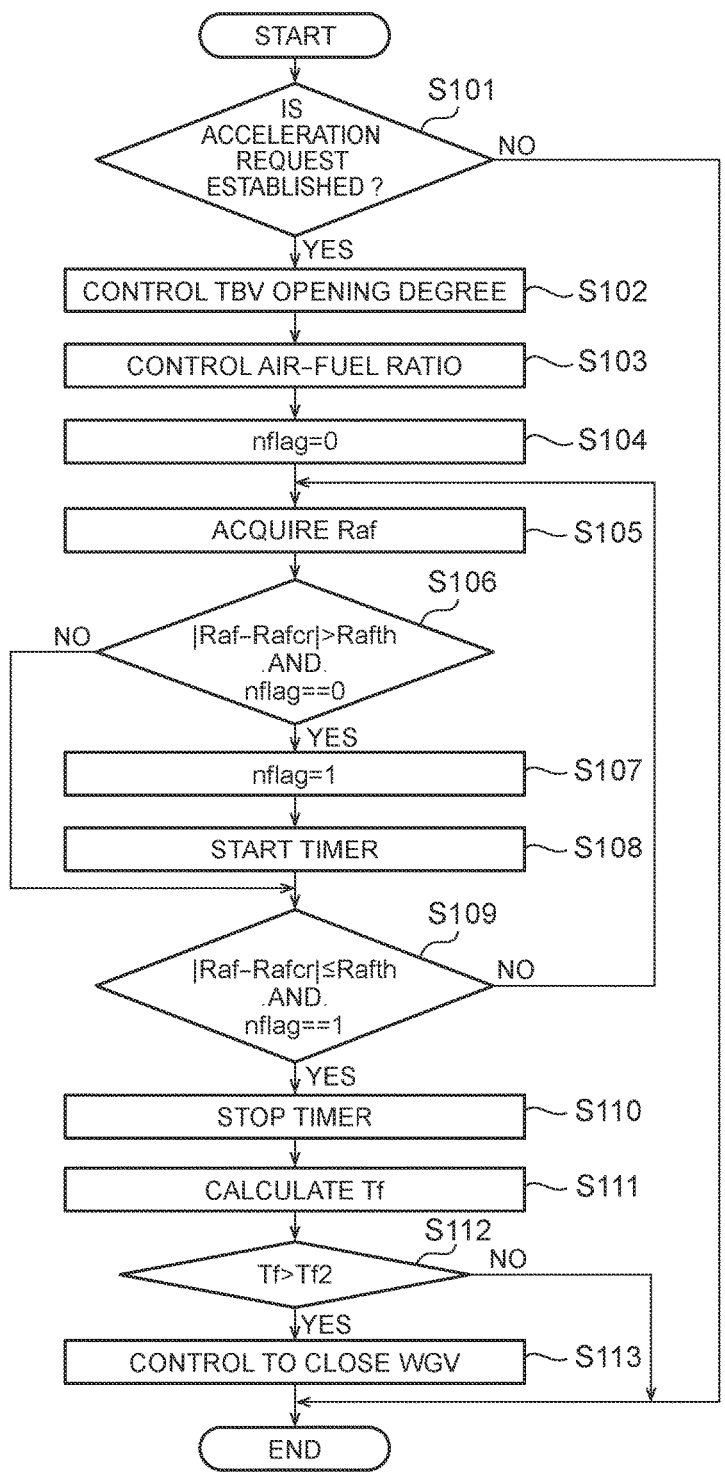

ND ABNORMALITY DIAGNOSIS SYSTEM FOR CONTROL APPARATUS FOR INTERNAL COMBUSTION ENGINE

CONTROL APPARATUS FOR INTERNAL COMBUSTION ENGINE, AND ABNORMALITY DIAGNOSIS SYSTEM FOR CONTROL APPARATUS FOR INTERNAL COMBUSTION ENGINE

CROSS-REFERENCE TO RELATED APPLICATIONS

This application claims priority to Japanese Patent Application No. 2016-252905 filed on Dec. 27, 2016, which is incorporated herein by reference in its entirety.

BACKGROUND

1. Technical Field

The disclosure relates to a control apparatus for an internal combustion engine including a turbocharger, and an abnormality diagnosis system for a control apparatus for an internal combustion engine.

2. Description of Related Art

In a configuration that a turbine of a turbocharger is installed in an exhaust passage of an internal combustion engine, a bypass passage that bypasses the turbine is provided in the exhaust passage. A waste gate valve (hereinafter, which may also be referred to as "WGV") is provided in the bypass passage in order to adjust the flow rate of exhaust gas that passes through the turbine. The waste gate valve is able to change the cross-sectional area of the passage of exhaust gas in the bypass passage.

On the other hand, Japanese Patent Application Publication No. 2001-050038 (JP 2001-050038 A) describes a configuration that, in an internal combustion engine including a turbocharger, an exhaust passage selector valve is provided at a merging point at which an exhaust passage and a bypass passage that bypasses a turbine merges. With the technique described in JP 2001-050038 A, when an exhaust gas purification catalyst provided in the exhaust passage downstream of the turbine and downstream of the merging point at which the bypass passage merges with the exhaust passage is inactive, the exhaust passage selector valve is controlled such that the turbine-side passage is fully closed and the bypass passage is fully open. Thus, the entire amount of exhaust gas is guided to the exhaust gas purification catalyst without passing through the turbine. As a result of such control over the exhaust passage selector valve, the entire amount of exhaust gas bypasses the turbine having a large heat capacity and flows into the exhaust gas purification catalyst, so the exhaust gas purification catalyst is early activated.

SUMMARY

In a configuration that a turbine of a turbocharger is installed in an exhaust passage of an internal combustion engine and a bypass passage that bypasses the turbine is provided in the exhaust passage, not only a WGV provided in the bypass passage but also a turbo bypass valve (hereinafter, which may also be referred to as "TBV") may be provided. The TBV is able to change the cross-sectional area of the passage of exhaust gas that passes through the turbine. In this case, the TBV is installed in the exhaust passage between a branching point of the bypass passage and a merging point of the bypass passage (that is, in the exhaust passage between an upstream-side connection point with the bypass passage and a downstream-side connection point with the bypass passage). With such a configuration, the cross-sectional area of the passage of exhaust gas that passes through the turbine is directly changed by adjusting the opening degree of the TBV. Thus, it is possible to control the flow rate of exhaust gas that passes through the turbine. Therefore, the flow rate of exhaust gas that passes through the turbine is set to substantially zero by setting the TBV in a fully closed state. Thus, it is possible to cause substantially the entire amount of exhaust gas to flow through the bypass passage.

In the internal combustion engine in which the WGV and the TBV are provided in this way, both the WGV and the TBV can be placed in a fully closed state structurally. If both the WGV and the TBV are placed in a fully closed state, the exhaust passage of the internal combustion engine is blocked. If the exhaust passage is blocked during operation of the internal combustion engine, the back pressure of the internal combustion engine increases. An increase in the back pressure may bring about an inconvenience, such as deterioration of combustion. Even when the exhaust passage is not blocked, if the opening degree of each of the WGV and the TBV, which makes the back pressure of the internal combustion engine significantly higher than the back pressure during normal operation (including normal aspiration operation and supercharging operation), is set during operation of the internal combustion engine, such an opening degree may bring about an inconvenience, such as deterioration of combustion. In this way, a state, including the state where the opening degree of each of the WGV and the TBV, which makes the back pressure of the internal combustion engine significantly higher than the back pressure during normal operation (including normal aspiration operation and supercharging operation), and a state where both the WGV and the TBV are fully closed both are referred to as a "blockage" of the exhaust passage below. For example, if there occurs a situation in which there is an abnormality in the TBV and the opening degree of the TBV is fixed to a value lower than or equal to a certain opening degree, the exhaust passage tends to be blocked.

The disclosure prevents a blockage of an exhaust passage in an internal combustion engine in which a WGV and a TBV are provided, and diagnoses whether there is an abnormality in the TBV.

In the internal combustion engine provided with the WGV and the TBV, when there is a predetermined acceleration request for shifting an operation status of the internal combustion engine from a normal aspiration region in which normal aspiration operation is performed (at this time, the WGV is open) to a supercharging region in which supercharging operation is performed, a control apparatus for the internal combustion engine controls the WGV and the TBV such that the flow rate of exhaust gas that passes through a turbine becomes larger than the flow rate in the normal aspiration region. More specifically, in the supercharging region, the control apparatus for the internal combustion engine inputs a required opening degree to the WGV such that the opening degree of the WGV becomes smaller than the opening degree in the normal aspiration region. In addition, in the supercharging region, the control apparatus for the internal combustion engine inputs a required opening degree to the TBV such that the opening degree of the TBV becomes larger than a predetermined reference opening degree (for example, the opening degree of the TBV becomes the opening degree of a fully open state). Such a required opening degree of the TBV is, for example, an opening degree at which exhaust gas corresponding to the predetermined acceleration request is fed to the turbine and the exhaust passage is not blocked at this time. The predetermined reference opening degree is a maximum opening degree of an opening degree at which the exhaust passage is blocked when the opening degree of the TBV is the predetermined reference opening degree in the supercharging region. Whether the exhaust passage is blocked depends not on the opening degree of the TBV only but on both the opening degree of the WGV and the opening degree of the TBV, so the predetermined reference opening degree can vary with a required opening degree of the WGV at that time.

When the opening degree of the TBV in the supercharging region is controlled in this way, it is possible to prevent a blockage of the exhaust passage. However, depending on the timing at which the opening degree of each of the WGV and the TBV actually becomes such an opening degree in response to a corresponding one of these required opening degrees, the exhaust passage can be blocked.

A first aspect of the disclosure provides a control apparatus for an internal combustion engine. The control apparatus includes a turbocharger, a bypass passage, a waste gate valve, a turbo bypass valve, an air-fuel ratio sensor and an electronic control unit. The turbocharger includes a turbine provided in an exhaust passage of the internal combustion engine and a compressor provided in an intake passage of the internal combustion engine. The bypass passage branches off from the exhaust passage at a branching point upstream of the turbine and merges with the exhaust passage at a merging point downstream of the turbine. The waste gate valve is installed in the bypass passage. The waste gate valve is configured to change a cross-sectional area of a passage of exhaust gas in the bypass passage. The turbo bypass valve is installed in the exhaust passage between the branching point and the merging point. The turbo bypass valve is configured to change a cross-sectional area of a passage of exhaust gas that passes through the turbine. The air-fuel ratio sensor is provided in the exhaust passage downstream of the merging point. The electronic control unit is configured to, when a predetermined acceleration request for shifting an operation status of the internal combustion engine from a normal aspiration region to a supercharging region is established and a required opening degree of the turbo bypass valve is larger than a predetermined reference opening degree, execute air-fuel ratio control for changing an air-fuel ratio of exhaust gas from the internal combustion engine for a predetermined first period, the normal aspiration region being a region in which normal aspiration operation is performed and the waste gate valve is open, the supercharging region being a region in which supercharging operation is performed, and, at the time when the waste gate valve is controlled in response to the predetermined acceleration request, close the waste gate valve on the basis of a convergence status of detected air-fuel ratio fluctuations, the detected air-fuel ratio fluctuations being fluctuations in air-fuel ratio that is detected by the air-fuel ratio sensor resulting from the air-fuel ratio control.

According to the first aspect of the disclosure, as the electronic control unit executes air-fuel ratio control, the air-fuel ratio of exhaust gas from the internal combustion engine varies for the predetermined first period. The air-fuel ratio of exhaust gas from the internal combustion engine is, for example, the air-fuel ratio of exhaust gas that is emitted from the internal combustion engine. However, the air-fuel ratio of exhaust gas that varies under air-fuel ratio control in the first aspect of the disclosure is not limited to this air-fuel ratio, and includes the air-fuel ratio of exhaust gas in the exhaust passage upstream of the branching point at which the bypass passage branches off from the exhaust passage. For example, when a fuel injection valve is provided in the exhaust passage upstream of the branching point or when a secondary air introducing valve is provided, it is possible to change the air-fuel ratio of exhaust gas from the internal combustion engine with the use of these valves. When the air-fuel ratio during normal operation (including normal aspiration operation and supercharging operation) of the internal combustion engine is controlled to a stoichiometric air-fuel ratio, the air-fuel ratio of exhaust gas varies to an air-fuel ratio richer or leaner than the stoichiometric air-fuel ratio as a result of the air-fuel ratio control. Such a variation in air-fuel ratio is detected by the air-fuel ratio sensor as fluctuations in air-fuel ratio.

The air-fuel ratio sensor is provided in the exhaust passage downstream of the merging point at which the bypass passage merges with the exhaust passage. Therefore, exhaust gas in the exhaust passage upstream of the branching point passes through the turbine or the bypass passage (including the case where exhaust gas passes through both the turbine and the bypass passage) and reaches the air-fuel ratio sensor. When the air-fuel ratio of exhaust gas from the internal combustion engine has varied for the predetermined first period as a result of the air-fuel ratio control, a period during which the variation in air-fuel ratio is detected by the air-fuel ratio sensor as fluctuations in air-fuel ratio varies depending on a path through which the exhaust gas reaches the air-fuel ratio sensor. More specifically, when exhaust gas passes through both the turbine and the bypass passage and reaches the air-fuel ratio sensor, a period during which the air-fuel ratio sensor detects a variation in the air-fuel ratio of exhaust gas from the internal combustion engine resulting from air-fuel ratio control as fluctuations in air-fuel ratio tends to be longer than when exhaust gas passes through only the bypass passage and reaches the air-fuel ratio sensor. This is because, since the turbine is a flow resistance, exhaust gas that passes through the turbine reaches the air-fuel ratio sensor later than exhaust gas that passes through the bypass passage. For this reason, the air-fuel ratio sensor detects fluctuations in air-fuel ratio for a relatively long period when exhaust gas passes through the turbine.

In light of the above, by focusing on fluctuations in air-fuel ratio that is detected by the air-fuel ratio sensor (hereinafter, which may also be referred to as "detected air-fuel ratio fluctuations") resulting from air-fuel ratio control, it is possible to estimate a path through which exhaust gas reaches the air-fuel ratio sensor by a certain extent. For example, when exhaust gas passes through only the bypass passage and reaches the air-fuel ratio sensor, detected air-fuel ratio fluctuations relatively early converge; whereas, when exhaust gas passes through both the turbine and the bypass passage and reaches the air-fuel ratio sensor, convergence of detected air-fuel ratio fluctuations tends to be relatively late. When the detected air-fuel ratio fluctuations relatively early converge although a required opening degree of the TBV is larger than the predetermined reference opening degree, if the WGV is closed by issuing a valve closing request command to the WGV in an open state, the exhaust passage can be blocked. This is because, at this time, the actual opening degree of the TBV is smaller than or equal to the predetermined reference opening degree although the required opening degree of the TBV is larger than the predetermined reference opening degree, and it is estimated that major part of exhaust gas that reaches the air-fuel ratio sensor passes through the bypass passage.

The electronic control unit that controls the closing timing of the WGV in response to the predetermined acceleration request closes the WGV on the basis of the convergence status of the detected air-fuel ratio fluctuations. With this configuration, the electronic control unit is able to close the WGV after detecting that the opening degree of the TBV becomes larger than the maximum opening degree of the opening degree at which the exhaust passage is blocked (that is, the predetermined reference opening degree). Closing the WGV means reducing the opening degree of the WGV as compared to the opening degree till then.

The control apparatus according to the first aspect of the disclosure executes air-fuel ratio control, detects that the opening degree of the TBV is larger than the predetermined reference opening degree, and then starts closing the WGV in response to the predetermined acceleration request. Thus, it is possible to prevent a blockage of the exhaust passage.

The electronic control unit of the control apparatus according to the first aspect of the disclosure may be configured to, when a convergence period that is a period from when the detected air-fuel ratio fluctuations begin to occur to when the detected air-fuel ratio fluctuations converge is longer than a predetermined second period, close the waste gate valve.

The predetermined second period is a period from when the detected air-fuel ratio fluctuations begin to occur to when the detected air-fuel ratio fluctuations converge in the case where the WGV is open and the opening degree of the TBV is the predetermined reference opening degree commensurate with the required opening degree of the WGV, which corresponds to the predetermined acceleration request. The predetermined second period is a period commensurate with the predetermined first period. The predetermined second period may be set in advance, or may be estimated in response to the operation status of the internal combustion engine. When the convergence period is longer than the predetermined second period, it may be determined that the opening degree of the TBV is larger than the predetermined reference opening degree. In this case, even when closing the WGV is started in response to the predetermined acceleration request, it is possible to avoid a blockage of the exhaust passage.

The electronic control unit of the control apparatus according to the first aspect of the disclosure may be configured to, when the detected air-fuel ratio fluctuations have not converged yet at the time when a predetermined second period has elapsed from when the detected air-fuel ratio fluctuations begin to occur, close the waste gate valve.

In this way, when the detected air-fuel ratio fluctuations have not converged yet at the time when the predetermined second period has elapsed from when the detected air-fuel ratio fluctuations begin to occur as well, it may be determined that the opening degree of the TBV is larger than the predetermined reference opening degree. In this case, even when closing the WGV is started in response to the predetermined acceleration request, it is possible to avoid a blockage of the exhaust passage.

A second aspect of the disclosure provides an abnormality diagnosis system for the above-described control apparatus. The abnormality diagnosis system includes the electronic control unit. The electronic control unit is configured to diagnose whether there is an abnormality in the turbo bypass valve on the basis of the convergence status of the detected air-fuel ratio fluctuations.

At the time when the above-described control apparatus controls the WGV in response to the predetermined acceleration request, the control apparatus detects that the opening degree of the TBV is larger than the predetermined reference opening degree on the basis of the convergence status of the detected air-fuel ratio fluctuations, and then closes the WGV. That is, unless the above situation is detected, the control apparatus does not close the WGV. This is because, if the WGV is closed in such a state, the exhaust passage may be blocked. In such a state, although the required opening degree of the TBV is larger than the predetermined reference opening degree, the actual opening degree of the TBV can be smaller than or equal to the predetermined reference opening degree. Therefore, the above-described abnormality diagnosis system includes the electronic control unit configured to diagnose whether there is an abnormality in the TBV on the basis of the convergence status of the detected air-fuel ratio fluctuations. Thus, it is possible to diagnose where there is an abnormality in the TBV.

The electronic control unit of the abnormality diagnosis system according to the second aspect of the disclosure may be configured to, when a convergence period that is a period from when the detected air-fuel ratio fluctuations begin to occur to when the detected air-fuel ratio fluctuations converge becomes shorter than or equal to a predetermined second period, diagnose that there is an abnormality in the turbo bypass valve.

When the convergence period is shorter than or equal to the predetermined second period, it may be determined that the actual opening degree of the TBV is smaller than or equal to the predetermined reference opening degree although the required opening degree of the TBV is larger than the predetermined reference opening degree. In this case, the electronic control unit is allowed to diagnose that there is an abnormality in the TBV.

The electronic control unit of the abnormality diagnosis system according to the second aspect of the disclosure may be configured to, when the detected air-fuel ratio fluctuations have converged at the time when a predetermined second period has elapsed from when the detected air-fuel ratio fluctuations begin to occur, diagnose that there is an abnormality in the turbo bypass valve.

In this way, when the detected air-fuel ratio fluctuations have converged at the time when the predetermined second period has elapsed from when the detected air-fuel ratio fluctuations begin to occur as well, it may be determined that the actual opening degree of the TBV is smaller than or equal to the predetermined reference opening degree although the required opening degree of the TBV is larger than the predetermined reference opening degree. In this case as well, the electronic control unit is allowed to diagnose that there is an abnormality in the TBV.

According to the aspects of the disclosure, in the internal combustion engine provided with the WGV and the TBV, it is possible to prevent a blockage of the exhaust passage and diagnose whether there is an abnormality in the TBV.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5B is a timing chart that shows changes in TBV opening degree, fuel injection amount, detected air-fuel ratio and WGV opening degree in the case where an actual opening degree of the TBV is a predetermined reference opening degree in the control shown in FIG. 4;

FIG. 6 is a flowchart that shows a control flow that is executed in a control apparatus for an internal combustion engine according to the first embodiment of the disclosure;

DETAILED DESCRIPTION OF EMBODIMENTS

Hereinafter, a mode for carrying out the disclosure will be described in details on the basis of exemplary embodiments with reference to the accompanying drawings. However, the scope of the disclosure is not intended to be limited to the dimensions, materials, shapes, relative arrangement, and the like, of components described in the embodiments unless otherwise specified.

First Embodiment

Figure 1:
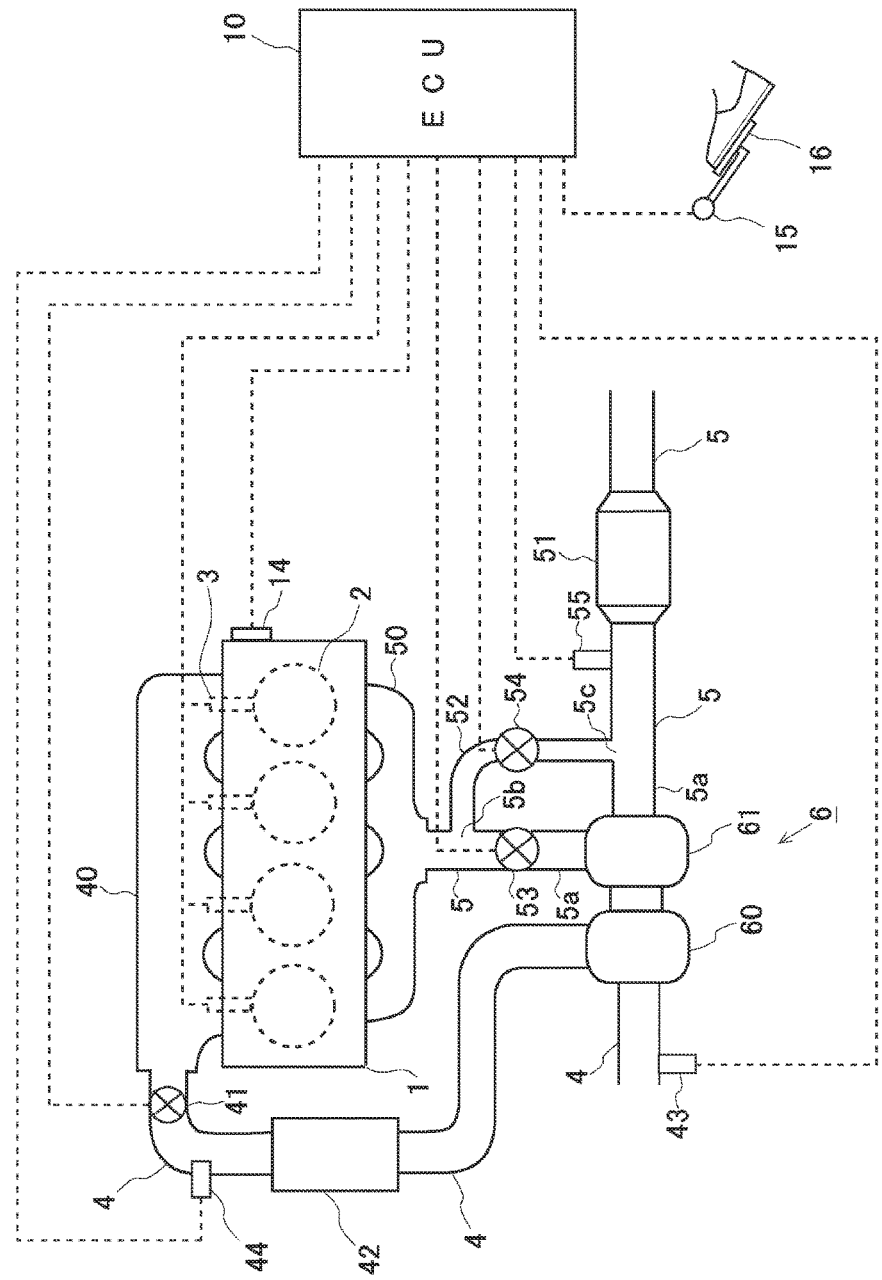
FIG. 1 is a view that shows the schematic configuration of an internal combustion engine and its intake and exhaust systems according to an embodiment of the disclosure.

A first embodiment of the disclosure will be described below with reference to the accompanying drawings. FIG. 1 is a view that shows the schematic configuration of an internal combustion engine and its intake and exhaust systems according to the present embodiment. The internal combustion engine 1 shown in FIG. 1 is a spark-ignition internal combustion engine (gasoline engine) provided with a cylinder group including four cylinders 2. The internal combustion engine 1 includes fuel injection valves 3. Each fuel injection valve 3 injects fuel into a corresponding one of intake ports. Each fuel injection valve 3 may be configured to directly inject fuel into a corresponding one of the cylinders 2. An ignition plug (not shown) is provided in each of the cylinders 2. Each ignition plug is used to ignite air-fuel mixture in the corresponding cylinder. However, the disclosure is also applicable to a compression-ignition internal combustion engine (diesel engine). In this case, each fuel injection valve 3 is configured to directly inject fuel into a corresponding one of the cylinders 2. No ignition plug is provided in each of the cylinders 2.

The internal combustion engine 1 is connected to an intake manifold 40 and an exhaust manifold 50. An intake passage 4 is connected to the intake manifold 40. A compressor 60 of a turbocharger 6 is provided in the intake passage 4. The turbocharger 6 is actuated by using the energy of exhaust gas as a driving source. An intercooler 42 is provided in the intake passage 4 downstream of the compressor 60. The intercooler 42 exchanges heat between intake air and outside air. A throttle valve 41 is provided in the intake passage 4 downstream of the intercooler 42. The throttle valve 41 adjusts the intake air amount of the internal combustion engine 1 by changing the cross-sectional area of the passage of intake air in the intake passage 4. A pressure sensor 44 is provided in the intake passage 4 upstream of the throttle valve 41. The pressure sensor 44 outputs an electrical signal corresponding to the pressure (that is, supercharging pressure) of intake air on the upstream side of the throttle valve 41. An air flow meter 43 is provided in the intake passage 4 upstream of the compressor 60. The air flow meter 43 outputs an electrical signal corresponding to the amount (mass) of intake air (air) flowing through the intake passage 4.

On the other hand, a turbine 61 of the turbocharger 6 is provided in an exhaust passage 5. An exhaust gas purification catalyst 51 is provided in the exhaust passage 5 downstream of the turbine 61. An oxidation catalyst or a three way catalyst is an example of the exhaust gas purification catalyst 51. A bypass passage 52 is provided in the exhaust passage 5. The bypass passage 52 bypasses the turbine 61. The bypass passage 52 branches off from the exhaust passage 5 at a branching point 5$b$ upstream of the turbine 61, and merges with the exhaust passage 5 at a merging point 5$c$ downstream of the turbine 61 and upstream of the exhaust gas purification catalyst 51. The exhaust passage 5 from the branching point 5$b$ via the turbine 61 to the merging point 5$c$ is referred to as turbine-side exhaust passage 5$a$. A turbo bypass valve (TBV) 53 is provided in the turbine-side exhaust passage 5$a$ between the branching point 5$b$ and the turbine 61. A waste gate valve (WGV) 54 is provided in the bypass passage 52. The TBV 53 adjusts the flow rate of exhaust gas passing through the turbine 61 by changing the cross-sectional area of the passage of exhaust gas flowing through the turbine-side exhaust passage 5$a$ (that is, exhaust gas passing through the turbine 61). The WGV 54 adjust the flow rate of exhaust gas flowing through the bypass passage 52 by changing the cross-sectional area of the passage of exhaust gas in the bypass passage 52. The TBV 53 may be provided in the turbine-side exhaust passage 5$a$ between the turbine 61 and the merging point 5$c$. An air-fuel ratio sensor 55 is provided in the exhaust passage 5 between the merging point 5$c$ and the exhaust gas purification catalyst 51. The air-fuel ratio sensor 55 outputs an electrical signal corresponding to the air-fuel ratio of exhaust gas in the exhaust passage 5 between the merging point 5c and the exhaust gas purification catalyst 51.

An electronic control unit (ECU) 10 is provided in association with the internal combustion engine 1. The ECU 10 is a unit that controls the operation status, and the like, of the internal combustion engine 1. Various sensors are electrically connected to the ECU 10. The various sensors include a crank position sensor 14, an accelerator position sensor 15, and the like, in addition to the air flow meter 43, the pressure sensor 44 and the air-fuel ratio sensor 55. The crank position sensor 14 is a sensor that outputs an electrical signal that correlates with the rotational position of an engine output shaft (crankshaft) of the internal combustion engine 1. The accelerator position sensor 15 is a sensor that outputs an electrical signal that correlates with the operation amount (accelerator operation amount) of an accelerator pedal 16 of a vehicle on which the internal combustion engine 1 is mounted. Output signals of these sensors are input to the ECU 10. The ECU 10 derives the engine rotation speed of the internal combustion engine 1 on the basis of a detected value of the crank position sensor 14. The ECU 10 derives the engine load of the internal combustion engine 1 on the basis of a detected value of the accelerator position sensor 15. The ECU 10 estimates the flow rate of exhaust gas that is emitted from the internal combustion engine 1 (the flow rate of exhaust gas that passes through the exhaust gas purification catalyst 51) on the basis of a detected value of the air flow meter 43. The ECU 10 acquires an air-fuel ratio on the basis of a detected value of the air-fuel ratio sensor 55.

Various devices are electrically connected to the ECU 10. The various devices include the fuel injection valves 3, the throttle valve 41, the TBV 53, the WGV 54, and the like. The ECU 10 controls these various devices on the basis of the above-described detected values of the sensors. That is, the opening degrees of the throttle valve 41, TBV 53 and WGV 54 are controlled by the ECU 10.

Figure 2:
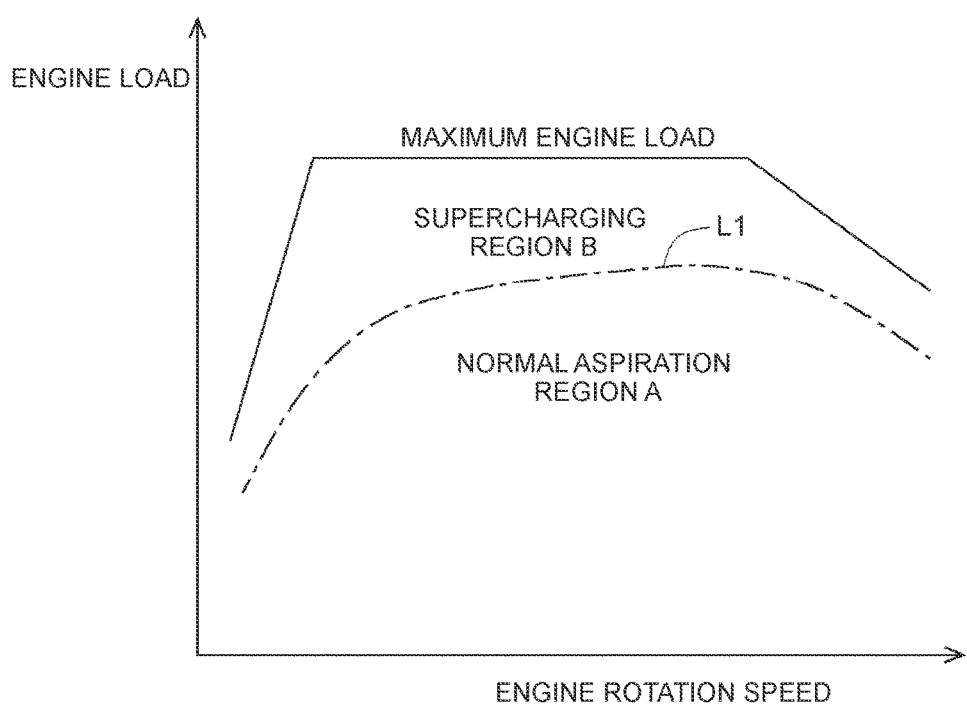
FIG. 2 is a graph that shows the correlation between an operation status of the internal combustion engine and each of a normal aspiration region and a supercharging region according to the embodiment of the disclosure.

In the internal combustion engine 1 according to the present embodiment, the opening degrees of the throttle valve 41, TBV 53 and WGV 54 are controlled in response to the operation status of the internal combustion engine 1. Thus, normal aspiration operation or supercharging operation is selectively performed. FIG. 2 is a graph that shows the correlation between the operation status of the internal combustion engine 1 and each of a normal aspiration region and a supercharging region. The normal aspiration region is an operation region in which normal aspiration operation is performed. The supercharging region is an operation region in which supercharging operation is performed. In FIG. 2, the abscissa axis represents the engine rotation speed of the internal combustion engine 1, and the ordinate axis represents the engine load of the internal combustion engine 1.

In FIG. 2, the line L1 indicates a predetermined load Le that is a boundary between the normal aspiration region and the supercharging region. The predetermined load Le corresponds to a maximum engine load in normal aspiration operation. That is, a region A in which the engine load is lower than or equal to the predetermined load Le is the normal aspiration region, and a region B in which the engine load is higher than the predetermined load Le is the supercharging region. When the operation status of the internal combustion engine 1 falls within the normal aspiration region A, the WGV 54 is controlled to a fully open state, and the opening degree of the TBV 53 (hereinafter, which may also be referred to as "TBV opening degree") and the opening degree of the throttle valve 41 (hereinafter, which may also be referred to as "throttle opening degree") are controlled to opening degrees appropriate for a required operation status. Thus, normal aspiration operation is performed. For example, when the operation status of the internal combustion engine 1 falls within the normal aspiration region A and warm-up of the exhaust gas purification catalyst 51 is required because the temperature of the exhaust gas purification catalyst 51 is lower than an active temperature, the TBV 53 is controlled to the fully closed state. Accordingly, substantially the entire amount of exhaust gas bypasses the turbine 61 having a large heat capacity, and flows into the exhaust gas purification catalyst 51. For this reason, it is possible to early warm up the exhaust gas purification catalyst 51 by using the heat energy of exhaust gas.

On the other hand, when the operation status of the internal combustion engine 1 falls within the supercharging region B, the throttle valve 41 and the TBV 53 are controlled to the fully open state, and the opening degree of the WGV 54 (hereinafter, which may also be referred to as "WGV opening degree") is controlled to an opening degree smaller than the fully open state and commensurate with a required supercharging pressure. Thus, the supercharging operation is performed. In this supercharging operation, the WGV opening degree is reduced as the required supercharging pressure increases.

Figure 3:
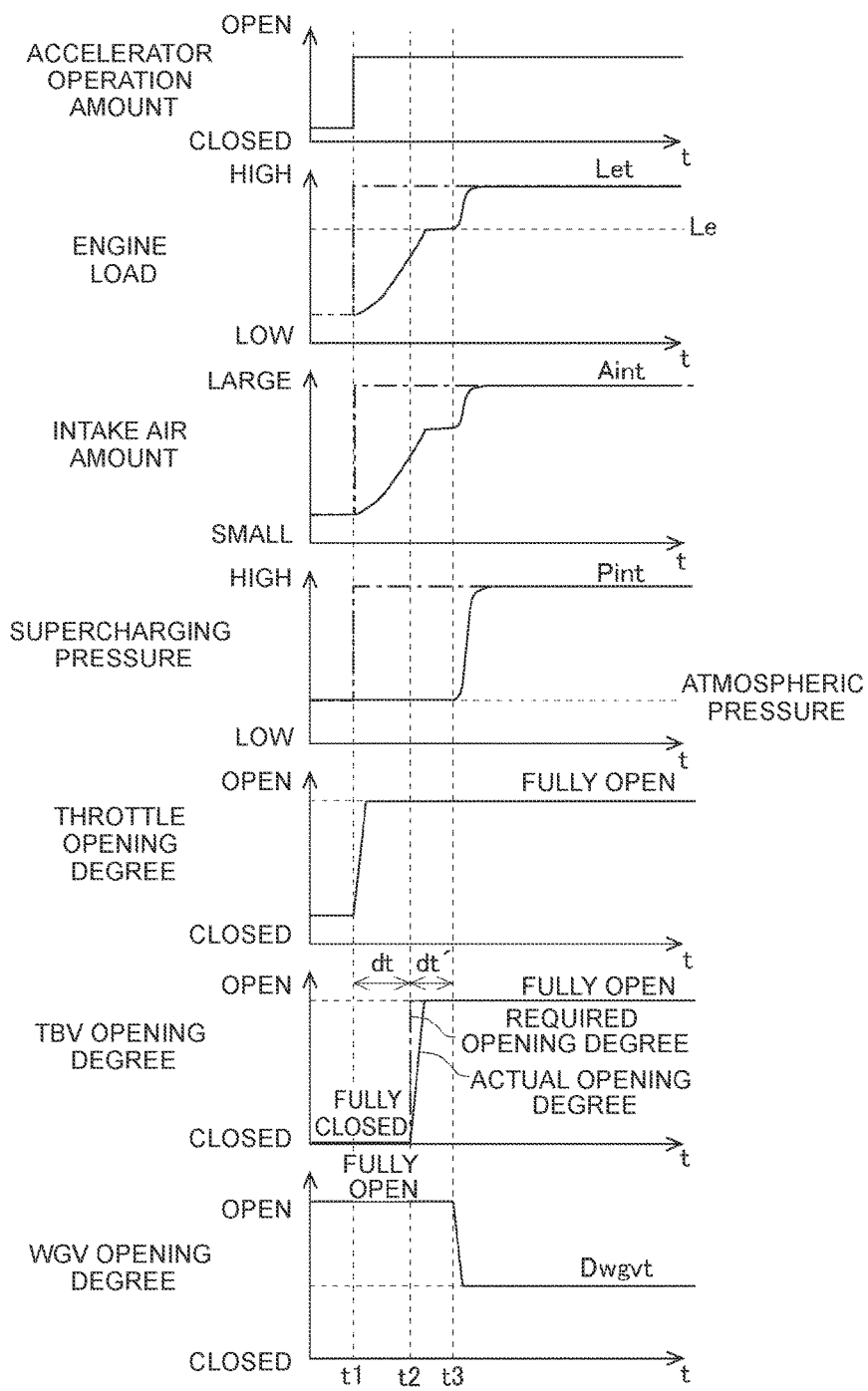
FIG. 3 is a timing chart that shows changes in accelerator operation amount, engine load, intake air amount, supercharging pressure and opening degrees of valves at the time when the operation status of the internal combustion engine shifts from the normal aspiration region to the supercharging region.

The details of opening degree control over the valves 41, 53, 54 at the time when the ECU 10 controls the WGV opening degree in response to a predetermined acceleration request based on which the operation status of the internal combustion engine 1 shifts from the normal aspiration region A to the supercharging region B in the above-described internal combustion engine 1 will be described with reference to FIG. 3. FIG. 3 is a timing chart that shows changes in accelerator operation amount, engine load, intake air amount, supercharging pressure and the opening degrees of the valves 41, 53, 54 at the time when the ECU 10 controls the WGV opening degree in response to the predetermined acceleration request. The alternate long and short dashes lines in the graphs of engine load, intake air amount and supercharging pressure in FIG. 3 respectively indicate changes in target engine load, changes in target air amount and changes in required supercharging pressure. The alternate long and short dashes line in the graph of TBV opening degree in FIG. 3 indicates a required opening degree from the ECU 10.

Before time t1 in FIG. 3, the operation status of the internal combustion engine 1 falls within the normal aspiration region A, and warm-up of the exhaust gas purification catalyst 51 is required because the temperature of the exhaust gas purification catalyst 51 is lower than the active temperature. At this time, the throttle opening degree and the TBV opening degree are controlled to opening degrees commensurate with the operation status of the internal combustion engine 1. More specifically, in order to early warm up the exhaust gas purification catalyst 51, the TBV 53 is controlled to the fully closed state. Before time t1, the WGV 54 is controlled to the fully open state. At time t1, the accelerator operation amount that is detected by the accelerator position sensor 15 increases, and acceleration operation is required. Thus, the target engine load Let becomes higher than the predetermined load Le. That is, the target engine load Let shifts into the supercharging region B. Accordingly, a target air amount Aint and a required supercharging pressure Pint also increase to values corresponding to the target engine load Let in the supercharging region B.

At time t1, control for bringing the throttle valve 41 into the fully open state is started, and then the throttle valve 41 is set to the fully open state. With the increase in throttle opening degree, the intake air amount gradually increases and the engine load also gradually increases from time t1. At time t2 after a lapse of a period dt from time t1, control for bringing the TBV 53 from the fully closed state to the fully open state is started (the required opening degree from the ECU 10 is set to the opening degree of the fully open state), and then the TBV 53 is set to the fully open state. At this time, the WGV 54 is kept in the fully open state, so, just after time t2 as well, the supercharging pressure remains near atmospheric pressure.

At time t3 after a lapse of a period dt' from time t2, control for closing the WGV 54 from the fully open state is started. In this way, in the control shown in FIG. 3, after a lapse of the period dt' from the start of control for bringing the TBV 53 from the fully closed state to the fully open state, control for closing the WGV 54 from the fully open state is started. After that, the WGV opening degree is set to a required WGV opening degree Dwgvt. Closing the WGV 54 means reducing the WGV opening degree as compared to the WGV opening degree till then in this way. The required WGV opening degree Dwgvt is a WGV opening degree commensurate with the required supercharging pressure Pint. As the WGV opening degree is controlled in this way, the supercharging pressure increases, and the intake air amount increases accordingly. As the supercharging pressure converges to the required supercharging pressure Pint and the intake air amount converges to the target air amount Aint, the engine load becomes the target engine load Let.

In the control shown in FIG. 3, as described above, after a lapse of the period dt' from the start of control for bringing the TBV 53 from the fully closed state to the fully open state, control for closing the WGV 54 from the fully open state is started. This prevents a blockage of the exhaust passage 5 of the internal combustion engine 1. The blockage of the exhaust passage 5 includes a state where the WGV opening degree and the TBV opening degree become opening degrees at which the back pressure of the internal combustion engine 1 significantly increases as compared to the back pressure during normal operation (including normal aspiration operation and supercharging operation) and a state where both the WGV 54 and the TBV 53 are fully closed. A blockage of the exhaust passage 5 during operation of the internal combustion engine 1 may cause deterioration of combustion, or the like.

However, if there is an abnormality in the TBV 53, an actual TBV opening degree may not be controlled to a required opening degree from the ECU 10. If the TBV 53 is fixed in the fully closed state, even when the ECU 10 tries to control the TBV 53 to the fully open state, the actual TBV opening degree remains in the fully closed state. In the control shown in FIG. 3, as described above, only the sequence of the start of control over the TBV 53 and the WGV 54 is determined, so, even in a state where the TBV 53 is fixed in the fully closed state, the ECU 10 starts control for closing the WGV 54 after a lapse of the period dt' from when the required opening degree has been input to the TBV 53. In this case, the WGV opening degree is reduced while the TBV 53 remains in the fully closed state, so the exhaust passage 5 may be blocked.

Therefore, at the time when the ECU 10 controls the WGV opening degree in response to the predetermined acceleration request to shift from the normal aspiration region A to the supercharging region B, the ECU 10 initially executes air-fuel ratio control for changing the air-fuel ratio of exhaust gas from the internal combustion engine 1 for a predetermined first period. Subsequently, the ECU 10 acquires a convergence period that is a period from when fluctuations in air-fuel ratio that is detected by the air-fuel ratio sensor 55 (hereinafter, which may also be referred to as "detected air-fuel ratio fluctuations") begin to occur resulting from the air-fuel ratio control to when the detected air-fuel ratio fluctuations converge. The ECU 10 closes the WGV 54 on the basis of the convergence period. That is, the ECU 10 closes the WGV 54 on the basis of the convergence status of the detected air-fuel ratio fluctuations. This will be described in detail below with reference to the timing chart.

Figure 4:
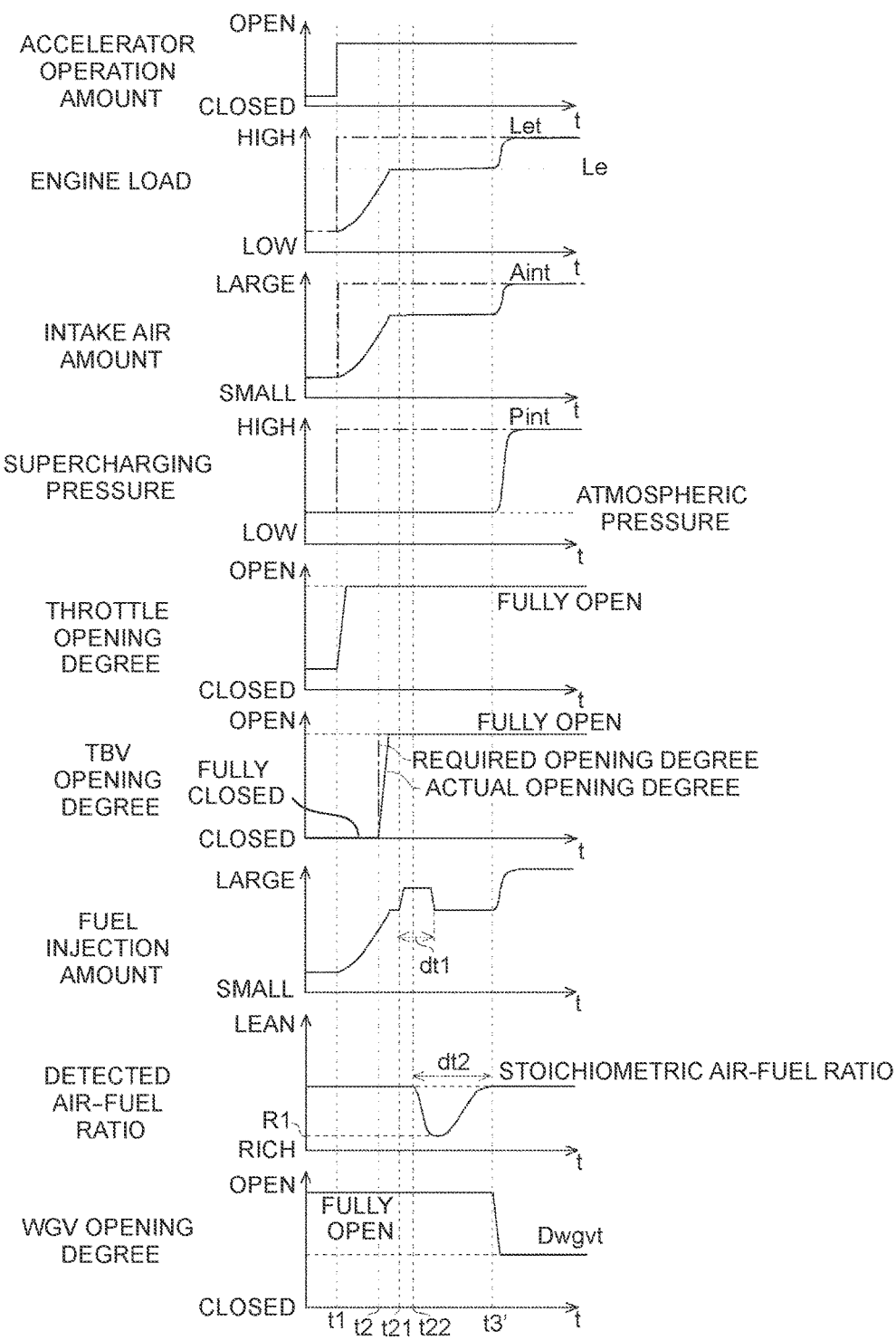
FIG. 4 is a timing chart that shows changes in accelerator operation amount, engine load, intake air amount, supercharging pressure, throttle opening degree, TBV opening degree, fuel injection amount, detected air-fuel ratio and WGV opening degree at the time when the WGV opening degree is controlled in response to a predetermined acceleration request on the basis of a first embodiment of the disclosure.

FIG. 4 is a timing chart that shows changes in accelerator operation amount, engine load, intake air amount, supercharging pressure, throttle opening degree, TBV opening degree, fuel injection amount from the fuel injection valves 3, air-fuel ratio that is detected by the air-fuel ratio sensor 55 (hereinafter, which may also be referred to as "detected air-fuel ratio") and WGV opening degree at the time when the ECU 10 controls the WGV opening degree in response to the predetermined acceleration request on the basis of the present embodiment. The alternate long and short dashes lines in the graphs of engine load, intake air amount and supercharging pressure in FIG. 4, as well as FIG. 3, indicate changes in target engine load, changes in target air amount and changes in required supercharging pressure. The alternate long and short dashes line in the graph of TBV opening degree in FIG. 4 indicates a required opening degree from the ECU 10.

In the control shown in FIG. 4, as well as the control shown in FIG. 3, the predetermined acceleration request is established at time t1. At time t2, control for bringing the TBV 53 from the fully closed state to the fully open state is started. That is, at time t2, the required opening degree from the ECU 10 is set to the opening degree of the fully open state. After that, the actual opening degree of the TBV 53 becomes the opening degree of the fully open state.

In the first aspect of the disclosure, when the predetermined acceleration request is established and the required opening degree of the TBV 53 is larger than a predetermined reference opening degree, air-fuel ratio control is executed. The required opening degree of the TBV 53 is, for example, an opening degree at which exhaust gas corresponding to the predetermined acceleration request is allowed to be fed to the turbine 61 and the exhaust passage 5 is not blocked at this time. The predetermined reference opening degree is a maximum opening degree of an opening degree at which the exhaust passage 5 is blocked when the TBV opening degree is the predetermined reference opening degree in the supercharging region B. Whether the exhaust passage 5 is blocked depends not on the TBV opening degree only but on both the opening degree of the WGV 54 and the opening degree of the TBV 53, so the predetermined reference opening degree can vary with a required opening degree of the WGV 54 commensurate with the required supercharging pressure at that time. In the control shown in FIG. 4, at time t2, when the required opening degree of the TBV 53 is set to the opening degree of the fully open state and the TBV 53 is set to the fully open state, the exhaust passage 5 is not blocked irrespective of the WGV opening degree, so the required opening degree is larger than the predetermined reference opening degree.

As shown in FIG. 4, at time t21 after time t2, control for increasing the fuel injection amount (hereinafter, which may also be referred to as "injection amount increasing control") is started. In the control shown in FIG. 4, as a rule, the fuel injection amount is controlled by the ECU 10 such that the air-fuel ratio of exhaust gas from the internal combustion engine 1 becomes a stoichiometric air-fuel ratio during normal operation (including normal aspiration operation and supercharging operation) of the internal combustion engine 1. That is, before time t21, the fuel injection amount is controlled by the ECU 10 on the basis of the intake air amount at that time such that the air-fuel ratio of exhaust gas from the internal combustion engine 1 becomes the stoichiometric air-fuel ratio. Before and after time t21, the intake air amount almost remains unchanged. Therefore, at time t21, as injection amount increasing control is executed, the air-fuel ratio of exhaust gas from the internal combustion engine 1 becomes richer than the stoichiometric air-fuel ratio. As shown in FIG. 4, when injection amount increasing control is executed for the period dt1, the air-fuel ratio of exhaust gas from the internal combustion engine 1 varies for a predetermined first period (here, the period dt1). Therefore, the injection amount increasing control corresponds to the air-fuel ratio control according to the first aspect of the disclosure.

Since emissions and fuel efficiency may deteriorate as a result of injection amount increasing control, parameters, such as an allowance for increasing the fuel injection amount and an execution period of the control, are set to values at which a variation m air-fuel ratio is detectable by the air-fuel ratio sensor 55 and deterioration of emissions and fuel efficiency is minimized. The air-fuel ratio control according to the first aspect of the disclosure may be any control as long as the control changes the air-fuel ratio of exhaust gas in the exhaust passage 5 upstream of the branching point 5b, and is not limited to the above-described injection amount increasing control. For example, when a fuel injection valve is provided in the exhaust passage 5 upstream of the branching point 5b or when a secondary air introducing valve is provided, it is also possible to change the air-fuel ratio of exhaust gas from the internal combustion engine 1 with the use of such valves.

As the injection amount increasing control (air-fuel ratio control) is executed, the detected air-fuel ratio varies from the stoichiometric air-fuel ratio as shown in FIG. 4. More specifically, at time t22 after a lapse of a certain period from time t21, the detected air-fuel ratio begins to vary from the stoichiometric air-fuel ratio toward a rich side. After the detected air-fuel ratio becomes R1 that is richer than the stoichiometric air-fuel ratio, the detected air-fuel ratio converges to the stoichiometric air-fuel ratio at time t3'. Time t3' is the time after a lapse of a period dt2 from time t22, and the detected air-fuel ratio fluctuations converge in the period dt2. That is, the period dt2 corresponds to the convergence period.

The period dt2 is longer than the period dt1 that is the execution period of the injection amount increasing control. In other words, the convergence period (period dt2) is longer than the predetermined first period (period dt1) during which the air-fuel ratio of exhaust gas from the internal combustion engine 1 varies. This will be described below with reference to FIG. 5A and FIG. 5B.

Figure 5A:
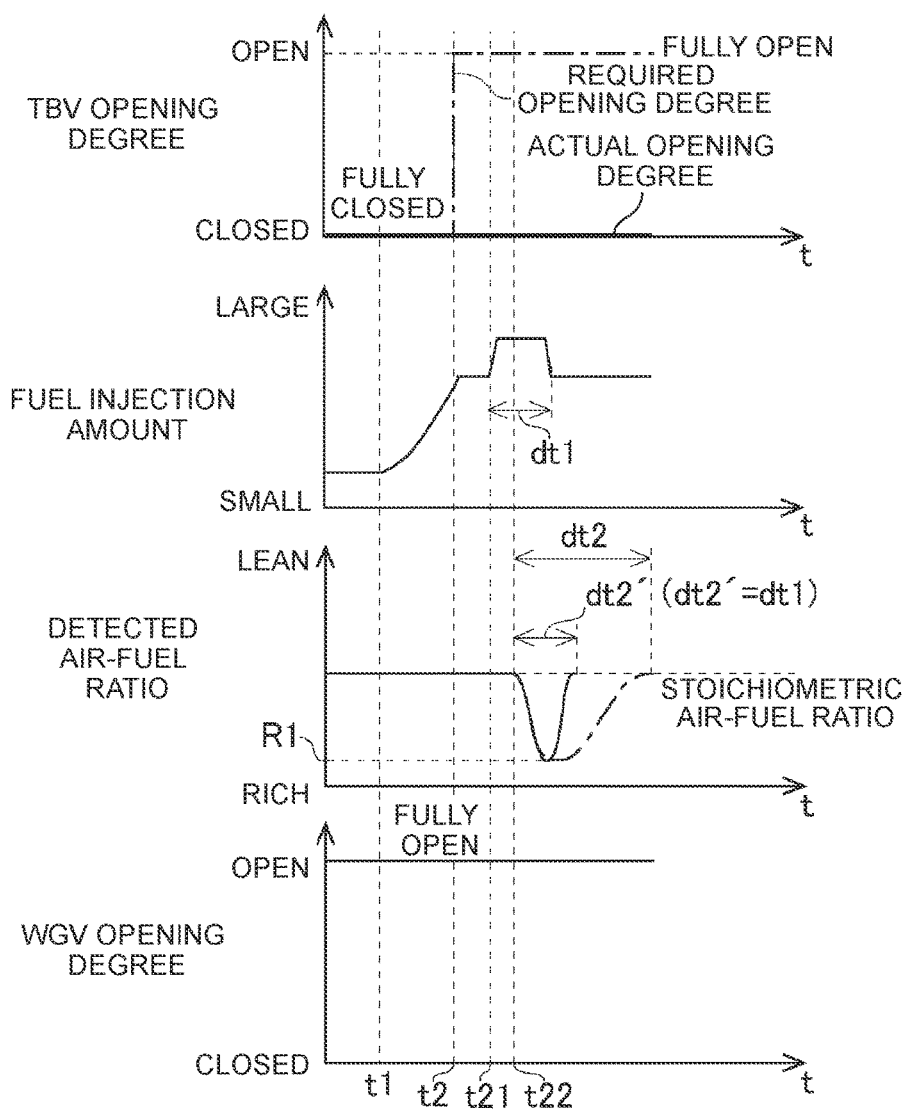
FIG. 5A is a timing chart that shows changes in TBV opening degree, fuel injection amount, detected air-fuel ratio and WGV opening degree in the case where an actual opening degree of the TBV remains in a fully closed state in control shown in FIG. 4.

FIG. 5A is a timing chart that shows changes in TBV opening degree, fuel injection amount from the fuel injection valves 3, detected air-fuel ratio and WGV opening degree in the case where the actual opening degree of the TBV 53 remains in the fully closed state although the required opening degree of the TBV 53 is set to the opening degree of the fully open state in the control shown in FIG. 4. The alternate long and short dashes line in the graph of detected air-fuel ratio in FIG. 5A indicates changes in detected air-fuel ratio in the case where the actual opening degree of the TBV 53 is controlled to the required opening degree.

As shown in FIG. 5A, at time t2, although the required opening degree of the TBV 53 is set to the opening degree of the fully open state, the actual opening degree of the TBV 53 remains in the fully closed state thereafter. At time t21, as injection amount increasing control is started and the control is executed for the period dt1, the detected air-fuel ratio begins to vary from the stoichiometric air-fuel ratio toward a rich side at time t22, and the detected air-fuel ratio converges to the stoichiometric air-fuel ratio after a lapse of a period dt2' from time t22. The period dt1 and the period dt2' are substantially the same length. That is, the predetermined first period and the convergence period are substantially the same. This is because, when the TBV 53 is placed in the fully closed state, substantially the entire amount of exhaust gas in the exhaust passage 5 upstream of the branching point 5b passes through the bypass passage 52 and reaches the air-fuel ratio sensor 55. In this case, a period of a variation in air-fuel ratio in the exhaust passage 5 upstream of the branching point 5b and a period during which fluctuations in air-fuel ratio are detected by the air-fuel ratio sensor 55 are substantially the same.

On the other hand, when the period dt2' and the period dt2 are compared with each other, the period dt2 is longer than the period dt2'. Since the air-fuel ratio sensor 55 outputs a current corresponding to the density of unburned gas, such as oxygen, CO and HC, in exhaust gas, although the period dt2' and the period dt2 have different lengths, the peaks of the detected air-fuel ratios toward a rich side both are R1. When the actual opening degree of the TBV 53 is controlled to the opening degree of the fully open state in response to a required opening degree, exhaust gas in the exhaust passage 5 upstream of the branching point 5b passes through the bypass passage 52 and the turbine 61 and reaches the air-fuel ratio sensor 55. At this time, since the turbine 61 is a flow resistance, exhaust gas that passes through the turbine 61 reaches the air-fuel ratio sensor 55 later than exhaust gas that passes through the bypass passage 52. Therefore, the air-fuel ratio sensor 55 detects fluctuations in air-fuel ratio for a period longer than that in the case where the actual opening degree of the TBV 53 remains in the fully closed state and exhaust gas passes through only the bypass passage 52 and reaches the air-fuel ratio sensor 55. Thus, the period dt2 is longer than the period dt2'. That is, in FIG. 4, the convergence period (period dt2) is longer than the predetermined first period (period dt1).

Next, FIG. 5B is a timing chart that shows the case where the actual opening degree of the TBV 53 becomes a predetermined reference opening degree Dcrit although the required opening degree of the TBV 53 is set to the opening degree of the fully open state in the control shown in FIG. 5A. The predetermined reference opening degree Dcrit is an opening degree commensurate with the required opening degree of the WGV 54, which corresponds to the predetermined acceleration request, and is an opening degree relatively close to the opening degree of the fully closed state in FIG. 5B. As described above, in the supercharging region B, as the actual opening degree of the TBV 53 becomes the predetermined reference opening degree Dcrit, the exhaust passage 5 is blocked.

In the control shown in FIG. 5B as well, a convergence period dt2" at this time is shorter than the convergence period dt2 in the control shown in FIG. 4. However, the period dt2" is longer than the period dt2'. This is because, since the TBV opening degree is the predetermined reference opening degree Dcrit in the control shown in FIG. 5B, major part of exhaust gas in the exhaust passage 5 upstream of the branching point 5b passes through the bypass passage 52 and reaches the air-fuel ratio sensor 55; however, there is also exhaust gas that passes through the turbine 61 and reaches the air-fuel ratio sensor 55.

In summary, the convergence period is the period dt2' in the case where the TBV 53 is in the fully closed state, the period dt2 in the case where the TBV 53 is in the fully open state or the period dt2" longer than the period dt2' and shorter than the period dt2 in the case where the TBV opening degree is the predetermined reference opening degree Dcrit. The predetermined reference opening degree Dcrit varies with the required opening degree of the WGV 54, which corresponds to the predetermined acceleration request. The convergence period (dt2") in the case where the TBV opening degree is the predetermined reference opening degree Dcrit becomes longer as the predetermined reference opening degree Dcrit approaches the opening degree of the fully open state. When the convergence period is longer than the period dt2" at the time when the TBV opening degree is the predetermined reference opening degree Dcrit, it may be determined that the TBV opening degree is larger than the predetermined reference opening degree Dcrit.

In the present embodiment, the ECU 10 closes the WGV 54 when the convergence period is longer than a predetermined second period. The predetermined second period is a period from when detected air-fuel ratio fluctuations begin to occur to when the detected air-fuel ratio fluctuations converge in the case where the WGV 54 is in the fully open state and the TBV opening degree is the predetermined reference opening degree Dcrit commensurate with the required opening degree of the WGV 54, which corresponds to the predetermined acceleration request. That is, the period dt2" described with reference to FIG. 5B corresponds to the predetermined second period.

Referring back to FIG. 4, the convergence period dt2 at this time is longer than the period dt2" (that is, the predetermined second period) as described above. That is, it may be determined that the TBV opening degree is larger than the predetermined reference opening degree Dcrit. In the control shown in FIG. 4, the ECU 10 acquires the convergence period dt2. Since the convergence period dt2 is longer than the predetermined second period, the ECU 10 starts control for closing the WGV 54 at time t3' after a lapse of the period dt2 from time t22.

With the above-described control processes, it is possible to determine whether the TBV opening degree is larger than the predetermined reference opening degree Dcrit, without adding any hardware component. When the WGV 54 is closed in response to the predetermined acceleration request after detecting the fact that the TBV opening degree is larger than the predetermined reference opening degree Dcrit, it is possible to prevent a blockage of the exhaust passage 5.

A control flow that is executed by the ECU 10 that is an electronic control unit that is included in the control apparatus for an internal combustion engine according to the first aspect of the disclosure will be described with reference to FIG. 6. FIG. 6 is a flowchart that shows the control flow according to the present embodiment. In the present embodiment, the flow is repeatedly executed by the ECU 10 at predetermined computation intervals during operation of the internal combustion engine 1.

In the flow, initially, in S101, it is determined whether the predetermined acceleration request to shift the operation status of the internal combustion engine 1 from the normal aspiration region A to the supercharging region B is established. The predetermined acceleration request is established in the case where the accelerator operation amount that is detected by the accelerator position sensor 15 increases and the target engine load of the internal combustion engine 1 is higher than the predetermined load Le. In S101, affirmative determination is made in such a case. When the throttle opening degree is controlled in accordance with the accelerator operation amount and the predetermined acceleration request is established, the required opening degree of the throttle valve 41 is set to the opening degree of the fully open state. When affirmative determination is made in S101, the ECU 10 proceeds to the process of S102. When negative determination is made in S101, execution of the flow ends.

When affirmative determination is made in S101, control over the TBV opening degree is subsequently executed in S102. As a rule, the ECU 10 sets the required opening degree of the TBV 53 to the opening degree of the fully open state. Thus, the TBV 53 is set to the fully open state, so the flow rate of exhaust gas that passes through the turbine 61 is increased. When the required opening degree of the TBV 53 is set to the opening degree of the fully open state in this way, it is understood that the required opening degree is larger than the predetermined reference opening degree as described above.

Subsequently, in S103, air-fuel ratio control is started. Air-fuel ratio control in S103 is started after affirmative determination is made in the process of S101 and then the process of S102 is executed, so the air-fuel ratio control is started when the predetermined acceleration request is established and the required opening degree of the TBV 53 is larger than the predetermined reference opening degree. As air-fuel ratio control is started in S103, the air-fuel ratio of exhaust gas from the internal combustion engine 1 varies for the predetermined first period (for example, the period dt1 shown in FIG. 4). That is, in the process from S104 (described later), air-fuel ratio control is continuously executed until the predetermined first period elapses. Air-fuel ratio control is, for example, the above-described injection amount increasing control. However, the air-fuel ratio control according to the first aspect of the disclosure is not limited to the injection amount increasing control. As described above, the air-fuel ratio control may be any control as long as the control changes the air-fuel ratio of exhaust gas in the exhaust passage 5 upstream of the branching point 5b.

Subsequently, in S104, a timer start flag nflag is initialized to 0. The timer start flag nflag is a flag for controlling a start of a timer. As the timer start flag nflag is set to 1, the timer is started as will be described later.

Subsequently, in S105, a detected air-fuel ratio Raf is acquired. In S105, at the execution timing of the process, an air-fuel ratio that is detected by the air-fuel ratio sensor 55 is acquired as the detected air-fuel ratio Raf. In S106, it is determined whether a difference (|Raf−Rafcr|) between the detected air-fuel ratio Raf acquired in S105 and a predetermined reference air-fuel ratio Rafer is larger than a predetermined air-fuel ratio threshold Rafth and the timer start flag nflag is 0. The predetermined reference air-fuel ratio Rafcr is an air-fuel ratio at the time when air-fuel ratio control is started, and is substantially equal to the air-fuel ratio during normal operation of the internal combustion engine 1 (for example, stoichiometric air-fuel ratio). The predetermined reference air-fuel ratio Rafer is stored in the ROM of the ECU 10. The predetermined air-fuel ratio threshold Rafth is a determination threshold for determining whether the detected air-fuel ratio Raf has fluctuated from the predetermined reference air-fuel ratio Rafcr, and is stored in the ROM of the ECU 10. When the difference is larger than the predetermined air-fuel ratio threshold Rafth, it may be determined that the detected air-fuel ratio Raf has fluctuated from the predetermined reference air-fuel ratio Rafcr. When affirmative determination is made in S106, this is the case where detected air-fuel ratio fluctuations resulting from air-fuel ratio control executed in S103 have begun to occur, and the ECU 10 proceeds to the process of S107. On the other hand, when negative determination is made in S106, this is the case where air-fuel ratio control is executed in S103 but detected air-fuel ratio fluctuations have not yet occurred, so the ECU 10 proceeds to the process of S109.

When affirmative determination is made in S106, the timer start flag nflag is subsequently set to 1 in S107. In S108, the timer is started.

When negative determination is made in S106 or after the process of S108, it is subsequently determined in S109 whether the difference (|Raf−Rafcr|) between the detected air-fuel ratio Raf acquired in S105 and the predetermined reference air-fuel ratio Rafcr is smaller than or equal to the predetermined air-fuel ratio threshold Rafth and the timer start flag nflag is 1. When the difference is smaller than or equal to the predetermined air-fuel ratio threshold Rafth, it is understood that the detected air-fuel ratio Raf is almost equal to the predetermined reference air-fuel ratio Rafcr. When affirmative determination is made in S109, this is the case where the detected air-fuel ratio fluctuations resulting from the air-fuel ratio control executed in S103 have converged, so the ECU 10 proceeds to the process of S110. On the other hand, when negative determination is made in S109, this is the case where the detected air-fuel ratio fluctuations have not yet occurred although the air-fuel ratio control is executed in S103 or the case where the detected air-fuel ratio fluctuations resulting from the air-fuel ratio control executed in S103 have not converged yet, so the ECU 10 returns to the process of S105.

When affirmative determination is made in S109, the timer is subsequently stopped in S110. In S111, a convergence period Tf is calculated. The convergence period Tf is a period from when detected air-fuel ratio fluctuations begin to occur to when the detected air-fuel ratio fluctuations converge, and is calculated on the basis of a time measured by the timer.

Subsequently, in S112, it is determined whether the convergence period Tf calculated in S111 is longer than the predetermined second period Tf2. The predetermined second period Tf2 is a period from when detected air-fuel ratio fluctuations begin to occur to when the detected air-fuel ratio fluctuations converge in the case where the WGV 54 is in the fully open state and the TBV opening degree is the predetermined reference opening degree commensurate with the required opening degree of the WGV 54, which corresponds to the predetermined acceleration request, as described above. The predetermined second period Tf2 is, for example, the period dt2" shown in FIG. 5B. The relationship between the predetermined second period Tf2 and the required opening degree of the WGV 54 is stored in advance in the ROM of the ECU 10 in form of map or function. In S112, the predetermined second period Tf2 is acquired with the use of the map or function, and the above-described determination is carried out. The map or function may be the one that incorporates operation parameters (such as an engine rotation speed and an exhaust gas flow rate) of the internal combustion engine 1. In this case, the predetermined second period Tf2 is acquired on the basis of the required opening degree of the WGV 54 and the operation status of the internal combustion engine 1. When affirmative determination is made in S112, this is the case where it may be determined that the TBV opening degree is larger than the predetermined reference opening degree, so the ECU 10 proceeds to the process of S113. On the other hand, when negative determination is made in S112, execution of the flow ends.

When affirmative determination is made in S112, control for closing the WGV 54 is subsequently executed in S113. As described above, when the operation status of the internal combustion engine 1 falls within the normal aspiration region A, the WGV 54 is controlled to the fully open state. In Si 13, the WGV 54 in the fully open state is closed, and the WGV opening degree is controlled to an opening degree (for example, the opening degree Dwgvt shown in FIG. 4) commensurate with the required supercharging pressure. In this way, executing control for closing the WGV 54 in the case where affirmative determination is made in S112 is, in other words, executing control for closing the WGV 54 after detecting the fact that the TBV opening degree is larger than the predetermined reference opening degree. After the process of S113, execution of the flow ends.

When the ECU 10 that is the electronic control unit included in the control apparatus for an internal combustion engine executes the above-described control flow, it is possible to prevent a blockage of the exhaust passage 5 at the time when the ECU 10 controls the WGV 54 in response to the predetermined acceleration request.

Alternative Embodiment to First Embodiment

Next, an alternative embodiment to the above-described first embodiment will be described. In the present alternative embodiment, the detailed description of substantially the same components and substantially the same control processes as those of the above-described first embodiment is omitted.

In the above-described first embodiment, the ECU 10 closes the WGV 54 when the convergence period Tf is longer than the predetermined second period Tf2. In other words, when the convergence period Tf is shorter than or equal to the predetermined second period Tf2, the ECU 10 does not close the WGV 54. This is because, in this case, although the required opening degree of the TBV 53 is larger than the predetermined reference opening degree, the actual TBV opening degree is smaller than or equal to the predetermined reference opening degree. The ECU 10 diagnoses whether there is an abnormality in the TBV 53 on the basis of the convergence status of detected air-fuel ratio fluctuations. In the present alternative embodiment, the ECU 10 diagnoses that there is an abnormality in the TBV 53 when the convergence period Tf is shorter than or equal to the predetermined second period Tf2.

Figure 7:
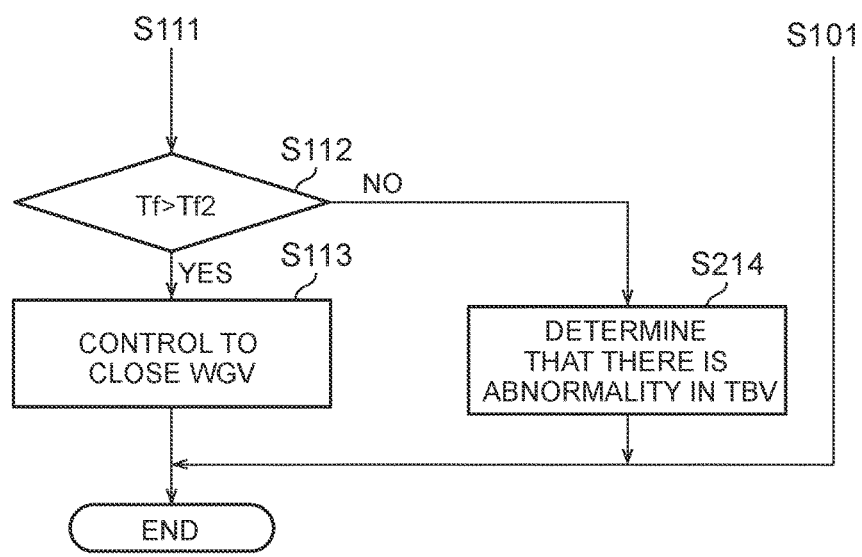
FIG. 7 is a flowchart that shows a control flow that is executed in a control apparatus for an internal combustion engine according to an alternative embodiment to the first embodiment of the disclosure.

A control flow that is executed by the ECU 10 that is the electronic control unit included in the abnormality diagnosis system for the control apparatus for an internal combustion engine according to the second aspect of the disclosure will be described with reference to FIG. 7. FIG. 7 is a flowchart that shows the control flow according to the alternative embodiment (present alternative embodiment) to the above-described first embodiment. The control flow shown in FIG. 7 differs from the control flow shown in FIG. 6 in that the process of S214 is added.

In the control flow shown in FIG. 7, when negative determination is made in S112, it is subsequently determined in S214 that there is an abnormality in the TBV 53. After the process of S214, execution of the flow ends.

When the ECU 10 that is the electronic control unit included in the abnormality diagnosis system for the control apparatus for an internal combustion engine executes the above-described control flow, it is possible to diagnose whether there is an abnormality in the TBV 53.

Second Embodiment

Next, a second embodiment of the disclosure will be described. In the present embodiment, the detailed description of substantially the same components and substantially the same control processes as those of the above-described first embodiment is omitted.

In the above-described first embodiment, the WGV 54 is closed on the basis of the convergence period. In contrast, in the present embodiment, the ECU 10 closes the WGV 54 on the basis of the convergence status of detected air-fuel ratio fluctuations at the time when the predetermined second period has elapsed from when detected air-fuel ratio fluctuations begin to occur. More specifically, the ECU 10 acquires a determination air-fuel ratio that is a detected air-fuel ratio at the time when the predetermined second period has elapsed from when detected air-fuel ratio fluctuations begin to occur. The ECU 10 closes the WGV 54 on the basis of the determination air-fuel ratio. This will be described in details below with reference to the timing chart.

Figure 8:
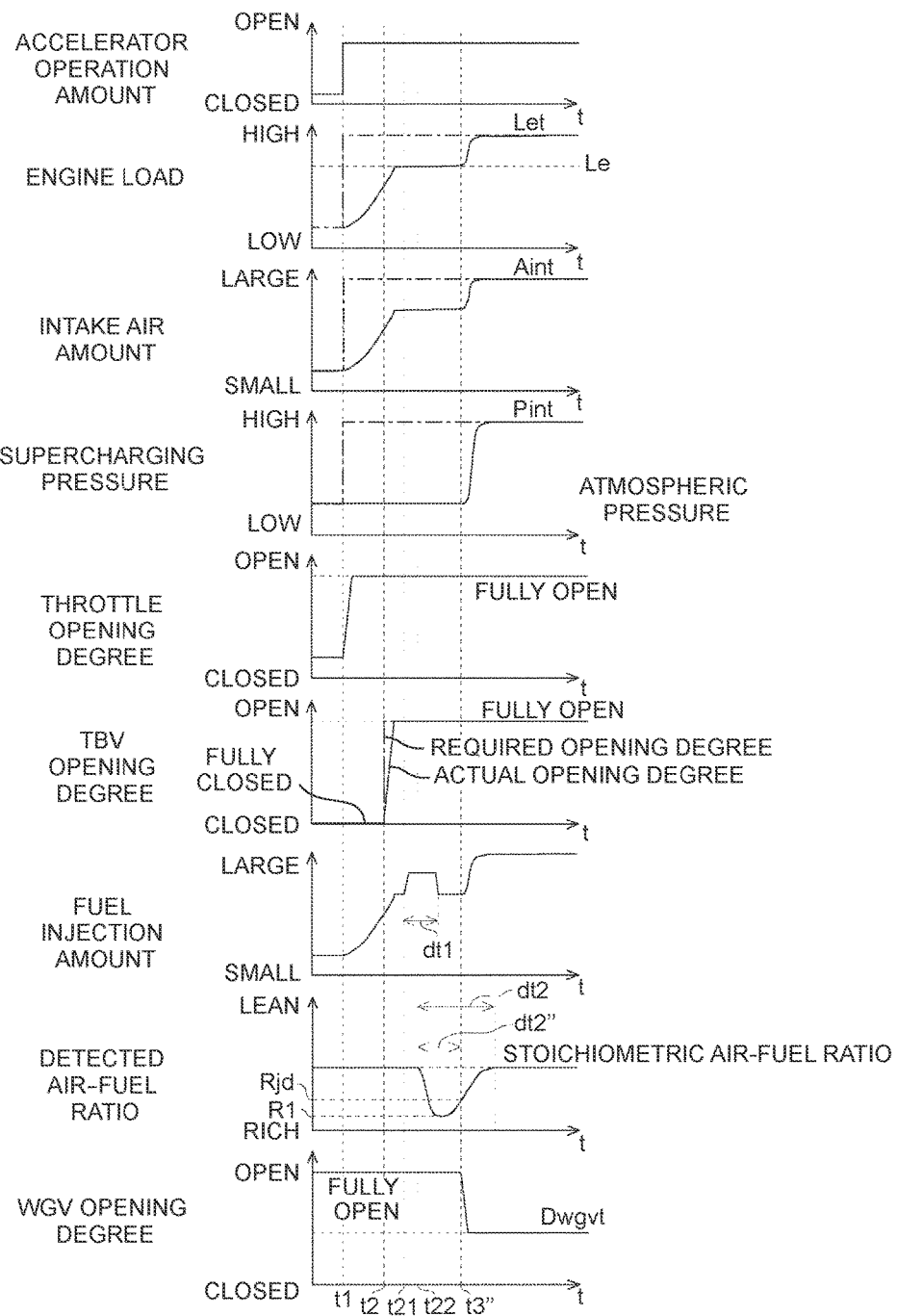
FIG. 8 is a timing chart that shows changes in accelerator operation amount, engine load, intake air amount, supercharging pressure, throttle opening degree, TBV opening degree, fuel injection amount, detected air-fuel ratio and WGV opening degree at the time when the WGV opening degree is controlled in response to a predetermined acceleration request on the basis of a second embodiment of the disclosure.

FIG. 8 is a timing chart that shows changes in accelerator operation amount, engine load, intake air amount, supercharging pressure, throttle opening degree, TBV opening degree, fuel injection amount from the fuel injection valves 3, detected air-fuel ratio and WGV opening degree at the time when the ECU 10 controls the WGV opening degree in response to the predetermined acceleration request on the basis of the present embodiment. The alternate long and short dashes lines in the graphs of engine load, intake air amount and supercharging pressure in FIG. 8, as well as FIG. 4, indicate changes in target engine load, changes in target air amount and changes in required supercharging pressure. The alternate long and short dashes line in the graph of TBV opening degree in FIG. 8, as well as FIG. 4, indicates a required opening degree from the ECU 10.

In the control shown in FIG. 8, until time t21 at which injection amount increasing control is started, control similar to the above-described control shown in FIG. 4 is executed. As in the case of the control shown in FIG. 4, when injection amount increasing control is executed for the period dt1, the air-fuel ratio of exhaust gas from the internal combustion engine 1 varies for the predetermined first period (here, the period dt1).

As the injection amount increasing control (air-fuel ratio control) is executed, the detected air-fuel ratio begins to vary from the stoichiometric air-fuel ratio to a rich side at time t22, and, after a lapse of the period dt2 from time t22, the detected air-fuel ratio that has fluctuated from the stoichiometric air-fuel ratio converges to the stoichiometric air-fuel ratio, as shown in FIG. 8. Such changes in detected air-fuel ratio are similar to the above-described changes in detected air-fuel ratio, shown in FIG. 4.

In the control shown in FIG. 8, a detected air-fuel ratio after a lapse of the period dt2" from time t22 at which the detected air-fuel ratio begins to vary from the stoichiometric air-fuel ratio is acquired. The period dt2" corresponds to the predetermined second period as described with reference to FIG. 4. Therefore, the detected air-fuel ratio corresponds to the above-described determination air-fuel ratio Rjd. As shown in FIG. 8, the determination air-fuel ratio Rjd is richer than the stoichiometric air-fuel ratio. That is, at time t3" after a lapse of the period dt2" from time t22, the determination air-fuel ratio Rjd has not converged to the stoichiometric air-fuel ratio yet.

As shown in FIG. 5B, when the TBV opening degree is the predetermined reference opening degree Dcrit, as the period dt2" elapses from when the detected air-fuel ratio begins to vary from the stoichiometric air-fuel ratio, the detected air-fuel ratio that has fluctuated from the stoichiometric air-fuel ratio converges to the stoichiometric air-fuel ratio. Therefore, when the determination air-fuel ratio Rjd has not converged to the stoichiometric air-fuel ratio yet, it may be determined that the TBV opening degree is larger than the predetermined reference opening degree Dcrit.

In the control shown in FIG. 8, the ECU 10 starts control for closing the WGV 54 at time t3" at which it may be determined that the TBV opening degree is larger than the predetermined reference opening degree Dcrit. In this case, in comparison with the case where the WGV 54 is closed after the convergence period is acquired as shown in FIG. 4, it is possible to quickly start control for closing the WGV 54.

With the above-described control processes as well, it is possible to determine whether the TBV opening degree is larger than the predetermined reference opening degree Dcrit, without adding any hardware component. When the WGV 54 is closed in response to the predetermined acceleration request after detecting the fact that the TBV opening degree is larger than the predetermined reference opening degree Dcrit, it is possible to prevent a blockage of the exhaust passage 5.

Figure 9:
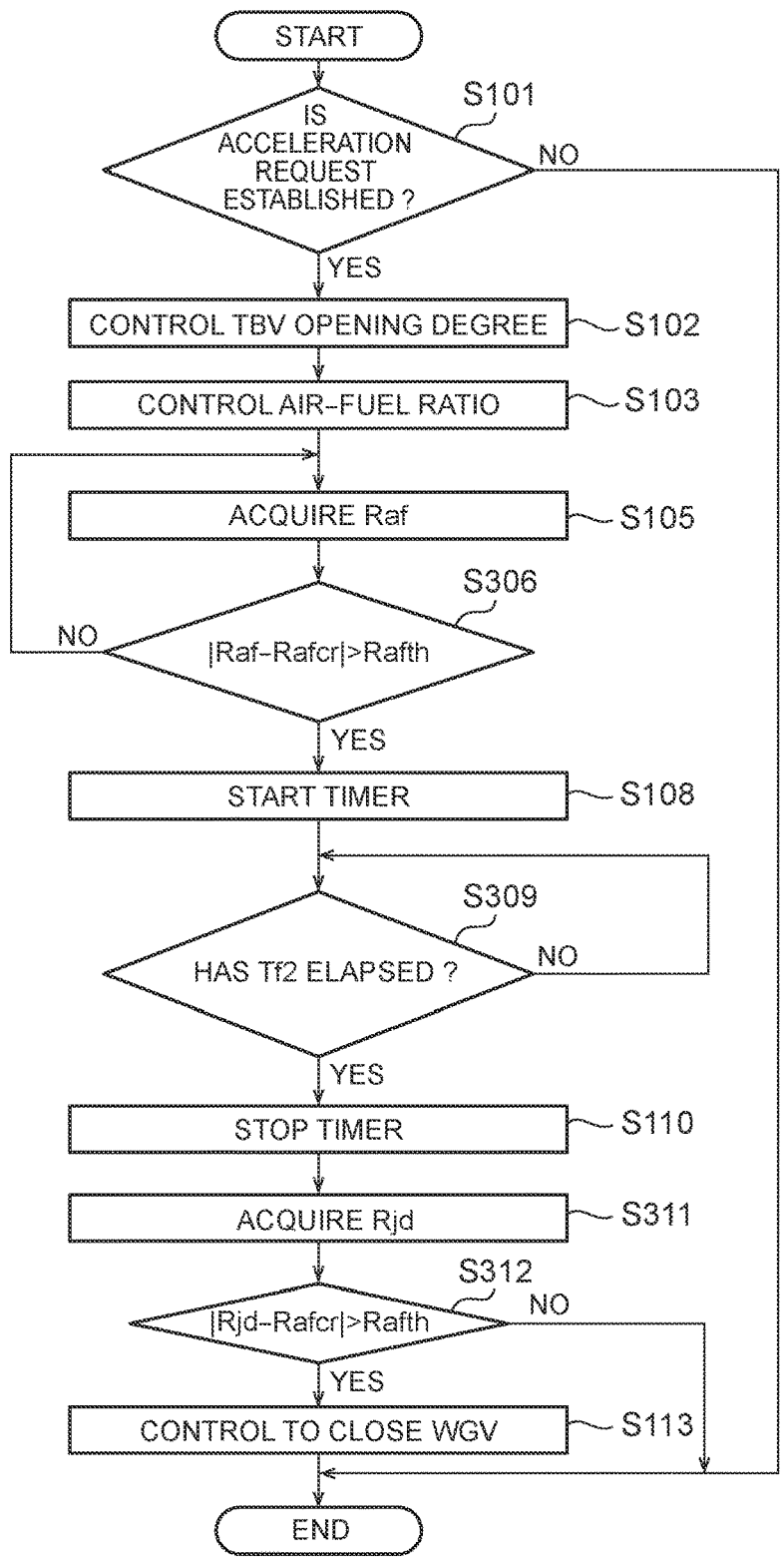
FIG. 9 is a flowchart that shows a control flow that is executed in a control apparatus for an internal combustion engine according to the second embodiment of the disclosure.

A control flow that is executed by the ECU 10 that is the electronic control unit included in the control apparatus for an internal combustion engine according to the first aspect of the disclosure will be described with reference to FIG. 9. FIG. 9 is a flowchart that shows the control flow according to the present embodiment. In the control flow shown in FIG. 9, the processes (S104, S107) regarding the timer start flag nflag in the flowchart shown in FIG. 6 are not executed. In the control flow shown in FIG. 9, the processes of S306, S309, S311 and S312 are executed instead of the processes of S106, S109, S111 and S112 in the flowchart shown in FIG. 6.

In the control flow shown in FIG. 9, the process of S105 is executed after the process of S103, and, after the process of S105, it is subsequently determined in S306 whether a difference (|Raf−Rafcr|) between the detected air-fuel ratio Raf acquired in S105 and the predetermined reference air-fuel ratio Rafer is larger than the predetermined air-fuel ratio threshold Rafth. The predetermined reference air-fuel ratio Rafer and the predetermined air-fuel ratio threshold Rafth are those as described in the first embodiment. When affirmative determination is made in S306, this is the case where detected air-fuel ratio fluctuations resulting from the air-fuel ratio control executed in S103 have begun to occur, so the ECU 10 proceeds to the process of S108. On the other hand, when negative determination is made in S306, this is the case where detected air-fuel ratio fluctuations have not occurred yet although the air-fuel ratio control has been executed in S103, so the ECU 10 returns to the process of S105.

When affirmative determination is made in S306, the process of S108 is subsequently executed. After the process of S108, it is subsequently determined in S309 whether the predetermined second period Tf2 has elapsed from when the timer is started in S108. The predetermined second period Tf2 is the one described in the first embodiment. When affirmative determination is made in S309, the ECU 10 proceeds to the process of S110. When negative determination is made in S309, the ECU 10 repeats the process of S309.

When affirmative determination is made in S309, the process of S110 is subsequently executed. After the process of S110, the determination air-fuel ratio Rjd is subsequently acquired in S311. The determination air-fuel ratio Rjd is a detected air-fuel ratio at the time when the predetermined second period Tf2 has elapsed from when detected air-fuel ratio fluctuations begin to occur as described above. In S311, at the execution timing of the process, an air-fuel ratio that is detected by the air-fuel ratio sensor 55 is acquired as the determination air-fuel ratio Rjd.

Subsequently, in S312, it is determined whether a difference (|Rjd−Rafcr|) between the determination air-fuel ratio Rjd acquired in S311 and the predetermined reference air-fuel ratio Rafer is larger than the predetermined air-fuel ratio threshold Rafth. When affirmative determination is made in S312, this is the case where the determination air-fuel ratio Rjd has not converged to the predetermined reference air-fuel ratio Rafcr yet and it may be determined that the TBV opening degree is larger than the predetermined reference opening degree, so the ECU 10 proceeds to the process of S113. On the other hand, when negative determination is made in S312, execution of the flow ends.

When affirmative determination is made in S312, control for closing the WGV 54 is subsequently executed in S113. After the process of S113, execution of the flow ends.

When the ECU 10 that is the electronic control unit included in the control apparatus for an internal combustion engine executes the above-described control flow as well, it is possible to prevent a blockage of the exhaust passage 5 at the time when the ECU 10 controls the WGV 54 in response to the predetermined acceleration request.

Alternative Embodiment to Second Embodiment

Next, an alternative embodiment to the above-described second embodiment will be described. In the present alternative embodiment, the detailed description of substantially the same components and substantially the same control processes as those of the above-described second embodiment is omitted.

In the above-described second embodiment, the ECU 10 does not close the WGV 54 when the determination air-fuel ratio Rjd has converged to the predetermined reference air-fuel ratio Rafcr. This is because, in this case, although the required opening degree of the TBV 53 is larger than the predetermined reference opening degree, the actual TBV opening degree is smaller than or equal to the predetermined reference opening degree. In the present alternative embodiment, the ECU 10 diagnoses that there is an abnormality in the TBV 53 when the determination air-fuel ratio Rjd has converged to the predetermined reference air-fuel ratio Rafcr.

Figure 10:
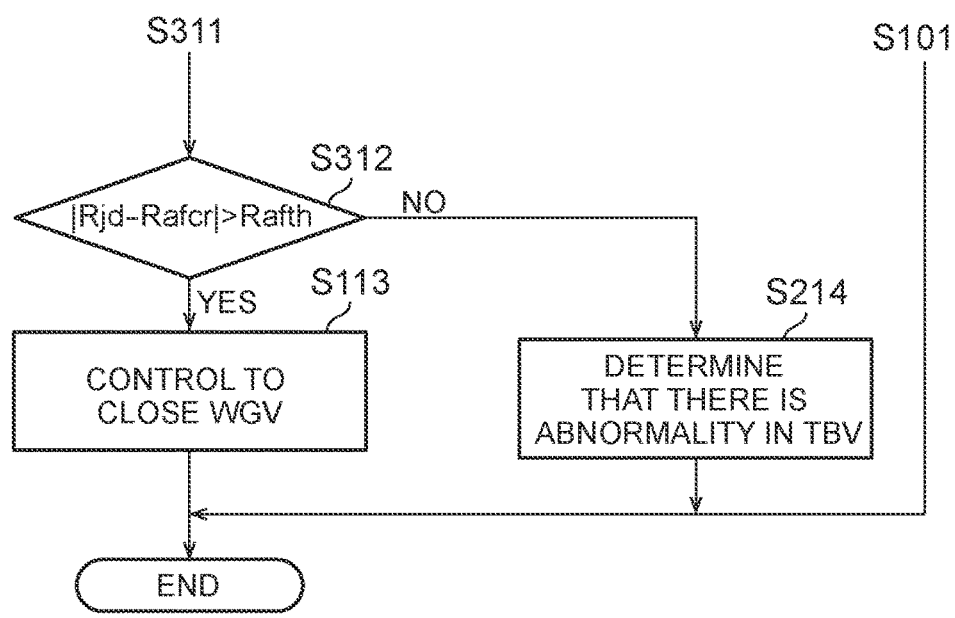
FIG. 10 is a flowchart that shows a control flow that is executed in a control apparatus for an internal combustion engine according to an alternative embodiment to the second embodiment of the disclosure.

A control flow that is executed by the ECU 10 that is the electronic control unit included in the abnormality diagnosis system for the control apparatus for an internal combustion engine according to the second aspect of the disclosure will be described with reference to FIG. 10. FIG. 10 is a flowchart that shows the control flow according to the alternative embodiment (present alternative embodiment) to the above-described second embodiment. The control flow shown in FIG. 10 differs from the control flow shown in FIG. 9 in that the process of S214 is added.

In the control flow shown in FIG. 10, when negative determination is made in S312, it is subsequently determined in S214 that there is an abnormality in the TBV 53. After the process of S214, execution of the flow ends.

When the ECU 10 that is the electronic control unit included in the abnormality diagnosis system for the control apparatus for an internal combustion engine executes the above-described control flow, it is possible to diagnose whether there is an abnormality in the TBV 53.

What is claimed is:

1. A control apparatus for an internal combustion engine, the control apparatus comprising:
    a turbocharger including a turbine provided in an exhaust passage of the internal combustion engine and a compressor provided in an intake passage of the internal combustion engine;
    a bypass passage that branches off from the exhaust passage at a branching point upstream of the turbine and that merges with the exhaust passage at a merging point downstream of the turbine;
    a waste gate valve installed in the bypass passage, the waste gate valve being configured to change a cross-sectional area of a passage of exhaust gas in the bypass passage;
    a turbo bypass valve installed in the exhaust passage between the branching point and the merging point, the turbo bypass valve being configured to change a cross-sectional area of a passage of exhaust gas that passes through the turbine;
    an air-fuel ratio sensor provided in the exhaust passage downstream of the merging point; and
    an electronic control unit configured to
        when a predetermined acceleration request for shifting an operation status of the internal combustion engine from a normal aspiration region to a supercharging region is established and a required opening degree of the turbo bypass valve is larger than a predetermined reference opening degree, execute air-fuel ratio control for changing an air-fuel ratio of exhaust gas from the internal combustion engine for a predetermined first period, the normal aspiration region being a region in which normal aspiration operation is performed and the waste gate valve is open, the supercharging region being a region in which supercharging operation is performed, and
        at the time when the waste gate valve is controlled in response to the predetermined acceleration request, close the waste gate valve based on a convergence status of detected air-fuel ratio fluctuations, the detected air-fuel ratio fluctuations being fluctuations in air-fuel ratio that is detected by the air-fuel ratio sensor resulting from the air-fuel ratio control.

2. The control apparatus according to claim 1, wherein the electronic control unit is configured to, when a convergence period that is a period from when the detected air-fuel ratio fluctuations begin to occur to when the detected air-fuel ratio fluctuations converge is longer than a predetermined second period, close the waste gate valve.

3. The control apparatus according to claim 1, wherein the electronic control unit is configured to, when the detected air-fuel ratio fluctuations have not converged yet at the time when a predetermined second period has elapsed from when the detected air-fuel ratio fluctuations begin to occur, close the waste gate valve.

4. An abnormality diagnosis system for the control apparatus according to claim 1, the abnormality diagnosis system comprising:

the electronic control unit configured to diagnose whether there is an abnormality in the turbo bypass valve based on the convergence status of the detected air-fuel ratio fluctuations.

5. The abnormality diagnosis system according to claim 4, wherein
the electronic control unit is configured to, when a convergence period that is a period from when the detected air-fuel ratio fluctuations begin to occur to when the detected air-fuel ratio fluctuations converge becomes shorter than or equal to a predetermined second period, diagnose that there is an abnormality in the turbo bypass valve.

6. The abnormality diagnosis system according to claim 4, wherein
the electronic control unit is configured to, when the detected air-fuel ratio fluctuations have converged at the time when a predetermined second period has elapsed from when the detected air-fuel ratio fluctuations begin to occur, diagnose that there is an abnormality in the turbo bypass valve.

* * * * *

UNITED STATES PATENT AND TRADEMARK OFFICE
CERTIFICATE OF CORRECTION

PATENT NO. : 10,337,422 B2  
APPLICATION NO. : 15/845447  
DATED : July 2, 2019  
INVENTOR(S) : Takanobu Hosoya et al.

Page 1 of 1

It is certified that error appears in the above-identified patent and that said Letters Patent is hereby corrected as shown below:

In the Specification

In Column 8, Line 59, after "WGV 54", delete "adjust" and insert --adjusts--, therefor.

Signed and Sealed this  
Twentieth Day of August, 2019

Andrei Iancu  
*Director of the United States Patent and Trademark Office*